United States Patent
Chmiel et al.

(10) Patent No.: US 9,392,597 B2
(45) Date of Patent: Jul. 12, 2016

(54) INFORMING A USER EQUIPMENT OF AN ACTIVITY STATUS OF A COMMUNICATION CARRIER

(75) Inventors: Mieszko Chmiel, Wroclaw (PL); Robert Buranyi, Budaors (HU); Bernd Baumgartner, Giengen (DE); Wolfgang Payer, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 69 days.

(21) Appl. No.: 14/361,334

(22) PCT Filed: Nov. 29, 2011

(86) PCT No.: PCT/EP2011/071228
§ 371 (c)(1),
(2), (4) Date: May 29, 2014

(87) PCT Pub. No.: WO2013/079092
PCT Pub. Date: Jun. 6, 2013

(65) Prior Publication Data
US 2014/0301348 A1 Oct. 9, 2014

(51) Int. Cl.
H04W 4/00 (2009.01)
H04W 72/04 (2009.01)
H04L 5/00 (2006.01)

(52) U.S. Cl.
CPC ............. *H04W 72/042* (2013.01); *H04L 5/001* (2013.01); *H04L 5/0055* (2013.01); *H04L 5/0082* (2013.01); *H04L 5/0098* (2013.01)

(58) Field of Classification Search
CPC ... H04W 72/042; H04L 5/0055; H04L 5/001; H04L 5/0082; H04L 5/0098
USPC .................... 370/329, 330, 431, 436; 455/509
See application file for complete search history.

(56) References Cited

U.S. PATENT DOCUMENTS 8,582,638 B2 * 11/2013 Earnshaw ............. H04L 1/0026
375/240
9,042,320 B2 * 5/2015 Kim ....................... H04L 5/0007
370/229

(Continued)

FOREIGN PATENT DOCUMENTS

EP        2 421 325 A1     2/2012
JP       2011-238999      11/2011

(Continued)

OTHER PUBLICATIONS

3GPP TSG-RAN WG2 Meeting #73, Taipei, Taiwan, Feb. 21-25, 2011, R2-111279, "Clarification on applying the common DRX operation to the SCell upon activation", HTC, 2 pgs.

(Continued)

*Primary Examiner* — Phuc Tran
(74) *Attorney, Agent, or Firm* — Harrington & Smith

(57) ABSTRACT

It is described a method for informing a user equipment of an activity status of a second communication carrier within a cellular network, wherein the user equipment is served by a base station and is adapted to communicate with the base station via a first communication carrier being assigned to the base station. Signals between the base station and the user equipment are transmittable using the first communication carrier and, if the second communication carrier is activated, using in addition the second communication carrier, wherein the first communication carrier is divided into subframes. The method includes sending an activity signal from the base station to the user equipment, wherein the activity signal includes information concerning the activity status of the second communication carrier, and re-sending the activity signal from the base station to the user equipment during predefined subframes.

20 Claims, 2 Drawing Sheets

(56) References Cited

U.S. PATENT DOCUMENTS

| | | | |
|---|---|---|---|
| 2011/0269490 A1* | 11/2011 | Earnshaw | H04L 1/0026 455/509 |
| 2012/0243510 A1* | 9/2012 | Takano | H04W 74/0833 370/331 |
| 2013/0028223 A1* | 1/2013 | Kim | H04L 5/0007 370/329 |
| 2013/0089058 A1* | 4/2013 | Yang | H04L 1/1822 370/329 |
| 2013/0165115 A1* | 6/2013 | Jung | H04L 5/001 455/434 |

FOREIGN PATENT DOCUMENTS

| | | |
|---|---|---|
| WO | WO 2011/119003 A2 | 9/2011 |
| WO | WO 2011/140037 A1 | 11/2011 |
| WO | WO 2012/023839 A2 | 2/2012 |

OTHER PUBLICATIONS

3GPP TSG-RAN WG2 Meeting #73bis, Shanghai, China, Apr. 11-15, 2011, R2-112096, "Secondary carrier activation status", Nokia Siemens Networks, 2 pgs.

\* cited by examiner

INFORMING A USER EQUIPMENT OF AN ACTIVITY STATUS OF A COMMUNICATION CARRIER

FIELD OF INVENTION

The present invention relates to the field of cellular networks and in particular to cellular networks using carrier aggregation.

ART BACKGROUND

In LTE, in particular in LTE Advanced, carrier aggregation (CA) has been specified in Rel-10. Carrier aggregation allows increasing the transmission/reception bandwidth by aggregating component carriers. In order to use carrier aggregation, an eNodeB (eNB or base station) first needs to configure a user equipment (UE) with one or more secondary cell(s) (SCell(s)) by RRC (radio resource control) signaling and then activate the SCell(s) by MAC (medium access control) signaling. The eNode B can also deactivate the SCell(s) by MAC signaling if it decides that CA is not needed anymore. The RRC configuration may be reliably acknowledged by higher layer signaling; however, the MAC activation/deactivation of the SCell is acknowledged by a L1 ACK/NACK. In case there is an NACK-to-ACK or DTX-to-ACK (false alarm) error, the eNode B and the UE will not be synchronized (in-sync) with respect to the SCell's activation status. The following problems may arise as a result. The eNode B may assume that the SCell is active while it is deactivated at the UE. This may lead to the scenario that any PDCCH/PDSCH and PUSCH scheduled transmissions on the SCell will be erroneous and will cause unnecessary interference. The eNode B may assume that the SCell is not active while it is activated at the UE. This may lead to the scenario that the UE will send CSI transmission which are not expected and will cause interference or that the UE will unnecessarily monitor the PDCCH on SCell and will waste its battery.

There may be a need for an improved system and method being adapted to reduce the probability of false activation or deactivation of a secondary cell or communication carrier.

SUMMARY OF THE INVENTION

This need may be met by the subject matter according to the independent claims. Advantageous embodiments of the present invention are described by the dependent claims.

According to a first aspect of the invention there is provided a method for informing a user equipment of an activity status of a second communication carrier within a cellular network, wherein the user equipment is served by a base station and is adapted to communicate with the base station via a first communication carrier being assigned to the base station, wherein signals between the base station and the user equipment are transmittable using the first communication carrier and, if the second communication carrier is activated, using in addition the second communication carrier, wherein the first communication carrier is divided into subframes. The method comprises sending an activity signal from the base station to the user equipment, wherein the activity signal comprises information concerning the activity status of the second communication carrier, and re-sending the activity signal from the base station to the user equipment during predefined subframes.

This aspect of the invention is based on the idea to improve the synchronization between the base station and the user equipment in view of a second communication carrier (or secondary cell) in order to avoid that the base station has activated/deactivated the second communication carrier but the user equipment has not notified this activation/deactivation.

In the following, the first communication carrier may also be referred to as primary cell and the second communication carrier may also be referred to as secondary cell (SCell). All carriers, i.e. the first and the second communication carrier, may be divided into sub-frames.

The term "base station" in this context may denote any kind of physical entity being able to hold one or more cells. A base station in this context may be any kind of network device providing the required functionality for the method, it may also be a transceiver node in communication with a centralized entity. The base station may be for example an eNodeB or eNB.

In the case of a failure of the communication between the base station and the user equipment (UE), the base station may assume that the SCell is active while it is deactivated at the UE. This may lead to the case that any scheduled transmissions on the SCell may be erroneous and may cause unnecessary interference. In another case, the base station may assume that the SCell is not active while it is activated at the UE. This may lead to the case that the UE may send transmission which are not expected and will cause interference. Further, the UE may unnecessarily monitor the channel on the SCell and may waste its battery.

To avoid the problem of false SCell activation/deactivation, after sending an SCell activation/deactivation command, i.e. the activity signal, the base station or eNB may repeat (in addition to HARQ retransmissions) the command at least once in a subframe(s) eligible for repetition. The method does therefore not only use a blind repetition of a command to reduce the possibility of a false event but additionally it may intelligently select the time of the repetition so that unnecessary HARQ retransmissions of the commands by the eNB are avoided.

According to an embodiment of the invention, re-sending the activity signal is carried out in addition to hybrid automatic repeat request transmissions.

It should be noted that the term "re-sending the activity signal from the base station to the user equipment during predefined subframes" might not denote HARQ (hybrid automatic repeat request transmissions) retransmission but may denote re-sending the activity signal in addition HARQ retransmissions.

According to a further embodiment of the invention, the information concerning the activity status comprises information about an activation or deactivation of the second communication carrier.

The eNB may inform the UE about an activation or deactivation of the second communication carrier. Hence, the UE may know whether to use only the first communication carrier or a combination of the first and the second communication carrier for any transmissions.

According to a further embodiment of the invention, sending the activity signal and re-sending the activity signal is based on sending a medium access control signal, also known as MAC control element.

Sending the activity signal may correspond to a common signal based on a medium access control signal. In addition to conventional signals, the eNB may re-send the activity signal based on a medium access control signal during specified or predefined subframes.

According to a further embodiment of the invention, the predefined subframes correspond to subframes, in which the user equipment is adapted to receive a signal from the base station.

The repetition or re-sending of the activity signal might not be restricted to a fixed time instance or a timer based period. A set of time instances eligible for repetition may be provided so that the eNB has a flexibility to transmit the repetition(s) for instance based on practical scheduler/resource restrictions. Furthermore, the UE might not require any special UE processing like a timer or identification that the command is being repeated.

According to a further embodiment of the invention, the method further comprises determining subframes, in which the user equipment is adapted to reconfigure a receiver, and defining the predefined subframes such that they are different than the determined sub-frames.

The subframes eligible for the re-sending, for instance MAC command repetition, may be defined so that it is ensured that they do not collide with the time when the UE retunes its receiver due to SCell activation/deactivation.

According to a further embodiment of the invention, the predefined subframes correspond to subframes, which follow a subframe with an acknowledgement signal received from the user equipment.

It should be noted that the base station may re-send the activity signal after receiving an acknowledgement signal from the base station or without waiting for an acknowledgement signal.

The eNB may ensure that at least two SCell activation/deactivation commands are acknowledged by the UE (for instance by receiving an acknowledgement signal). The eNB may assume that the SCell activation state is changed after receiving the acknowledgement signal for the repeated command or already after receiving the acknowledgement signal for the initial command. As the eNB cannot assume that the state is changed if none of the commands is acknowledged by the UE, the eNB may repeat the command after receiving the acknowledgement for the previous command or without waiting for the ACK/HARQ retransmissions of the previous command. Preferably, the repeated command(s) may be sent on the cell that is not supposed to change its activation state for this addressed UE. This may be typically the primary cell, i.e. the first communication carrier.

According to a further embodiment of the invention, the method further comprises further re-sending the activity signal from the base station to the user equipment during pre-defined subframes.

Re-sending the activity signal may be repeated several times. The number of repetitions may be pre-defined or may be specified based on channel conditions.

According to a further embodiment of the invention, the method further comprises sending, before sending the activity signal, a configuration signal for configuring the user equipment to transmit signals by using the first communication carrier and the second communication carrier, if the second communication carrier is activated.

In order to use carrier aggregation, the eNB may first configure the UE with one or more SCell(s). This may denote that the UE may be informed how to use the one or more second communication carriers (or SCell(s)), when they are activated.

According to a further embodiment of the invention, the configuration signal is based on radio resource control signaling.

For configuring the UE in view of the further cell(s) or communication carrier(s), the eNB may use radio resource control (RRC) signaling.

According to a further embodiment of the invention, the method further comprises sending a further activity signal from the base station to the user equipment, wherein the further activity signal comprises information about an activity status of a third communication carrier, and re-sending the further activity signal from the base station to the user equipment during predefined subframes, wherein signals between the base station and the user equipment are transmittable using the first communication carrier and, if the second communication carrier and/or the third communication carrier is activated, using in addition the second communication carrier and/or the third communication carrier.

The base station may be able to aggregate more than two communication carriers, i.e. the first and the second communication carrier as well as a third or fourth communication carrier. By aggregating a plurality of communication carriers, the bandwidth of the communication channel may be extended.

According to a second aspect of the invention, there is provided a base station for informing a user equipment of an activity status of a second communication carrier within a cellular network, wherein the user equipment is served by the base station and is adapted to communicate with the base station via a first communication carrier being assigned to the base station, wherein signals between the base station and the user equipment are transmittable using the first communication carrier and, if the second communication carrier is activated, using in addition the second communication carrier, wherein the first communication carrier is divided into subframes. The base station comprises a sending unit being adapted to send an activity signal to the user equipment, wherein the activity signal comprises information concerning the activity status of the second communication carrier, and being adapted to re-send the activity signal to the user equipment during pre-defined subframes.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver. The transceiver or the receiving unit and the sending unit may be adapted to communicate with the user equipment via an antenna.

The base station may further comprise a control unit, for instance being adapted to define the predefined subframes. The control unit may be implemented as a single unit or may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station.

The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

The user equipment may comprise a configuration unit for configuring the transmission based on the information received from the base station. Such a configuration unit may be adapted to configure the user equipment to transmit via the first communication carrier and/or the second communication carrier. The configuration unit of the user equipment may be implemented for example as part of a control unit, like a CPU or a microcontroller. The configuration unit and the transceiver may be coupled or may be implemented as one single unit.

According to a third aspect of the invention, there is provided a cellular network system, the cellular network system comprising a base station as described above.

Generally herein, the method and embodiments of the method according to the first aspect may include performing one or more functions described with regard to the second or third aspect or an embodiment thereof. Vice versa, the base station or cellular network system and embodiments thereof according to the second and third aspect may include units or devices for performing one or more functions described with regard to the first aspect or an embodiment thereof.

According to a fourth aspect of the herein disclosed subject-matter, a computer program for informing a user equipment of an activity status of a second communication carrier within a cellular network is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of configuring a communication channel. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless otherwise notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

Figure 1:
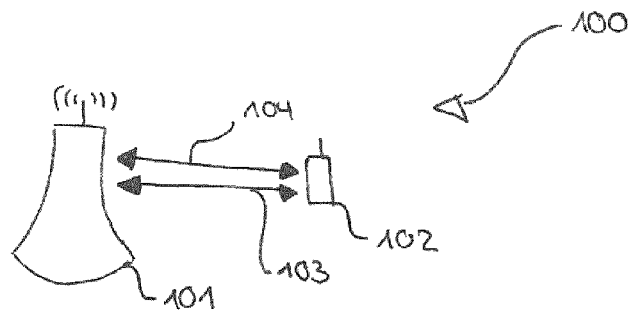
FIG. 1 shows a cellular network system according to an exemplary embodiment of the present invention.

The illustration in the drawing is schematically. It is noted that in different figures, similar or identical elements are provided with the same reference signs.

In the following, embodiments of the herein disclosed subject matter are illustrated with reference to the drawings and reference to aspects of current standards, such as LTE. However, such reference to current standards is only exemplary and should not be considered as limiting the scope of the claims.

FIG. 1 shows a cellular network system 100. A user equipment 102 within the cellular network system is served by a base station 101. The base station or eNB 101 and the user equipment or UE 102 communicate via a first communication carrier 103.

For extending the bandwidth for transmissions between the eNB and the UE, carrier aggregation can be applied. To use carrier aggregation, the eNB first configures the UE to be able to use more than one communication carrier (also called cell).

When the eNB determines that a carrier aggregation (CA) may be appropriate, it may inform the UE of an activity status of a second communication carrier 104 (secondary cell, SCell). After the UE has been informed about the activation, it may use in addition to the first communication carrier also the second communication carrier.

For informing the UE about the activity status, the eNB sends an activity signal to the UE, wherein the activity signal comprises information concerning the activity status of the second communication carrier, and re-sends the activity signal during predefined sub-frames. The information concerning the activity status may comprise information about an activation or deactivation of the second communication carrier.

Figure 2:
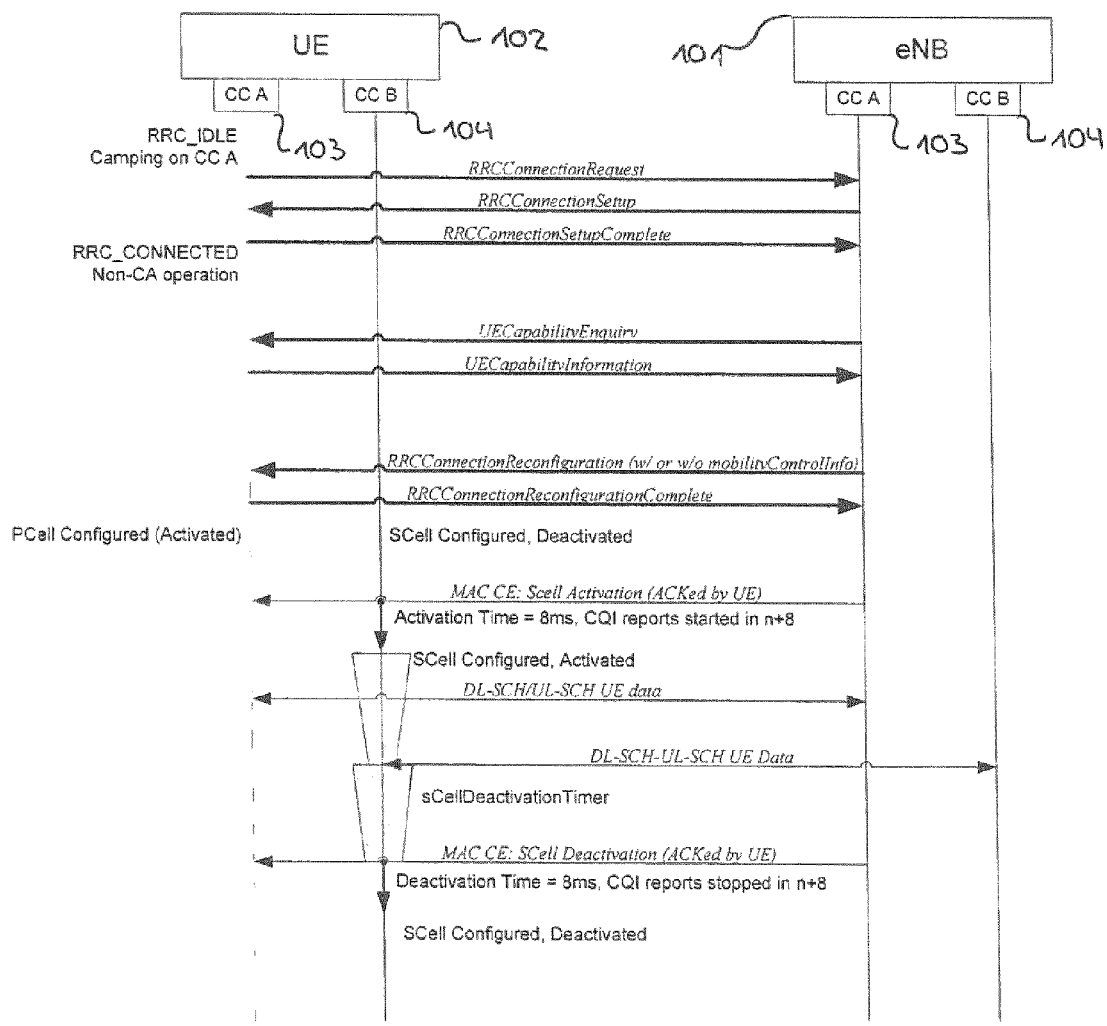
FIG. 2 shows a message flow diagram for activating or deactivating a secondary cell.

FIG. 2 shows a message flow diagram for activating or deactivating the secondary cell. In order to use Carrier Aggregation, the eNB 101 first configures the UE with a SCell(s) by RRC signaling and then activates the SCell(s) by MAC signaling. The eNB can also deactivate the SCell(s) by MAC signaling if it decides that CA is not needed anymore. The SCell(s) can be also deactivated implicitly by a timer.

As can be seen in FIG. 2, the RRC configuration is reliably acknowledged by higher layer signaling; however, the MAC activation/deactivation is acknowledged by a L1 ACK/NACK. In case there is an NACK-to-ACK or DTX-to-ACK (false alarm) error on PUCCH/PUSCH, the eNB and the UE will not be in-sync with respect to the SCell's activation status.

The following problems may arise as a result. The eNB may assume that the SCell is active while it is deactivated at the UE; thus, any PDCCH/PDSCH and PUSCH scheduled transmissions on the SCell will be erroneous and will cause unnecessary interference. The eNB may assume that the SCell is not active while it is activated at the UE; thus, the UE may send CSI transmission which are not expected and will cause interference or the UE may unnecessarily monitor the PDCCH on SCell and may waste its battery.

The problem of lack of common understanding between the UE and the eNB of the SCell's activation status was noticed in 3GPP. The following observations are made:

- The activation/deactivation time is specified as 8 ms which eliminates the micro uncertainty about when exactly the UE will apply the correctly received MAC CE with an activation/deactivation command. However, this solution does not apply to the above problems when the MAC CE is not received correctly.
- Formats of some channels are invariant to SCell activation e.g. PUCCH format 1b with channel selection depends on the SCell configuration only. This allows receiving these channels correctly (e.g. ACK/NACK in the UL) even in case the UE and the eNode B have different assumptions on a SCell's activation status. However, his solution does not solve the above problems of unnecessary PDCCH/PDSCH/CSI transmission, wasted PUSCH allocation and unnecessary PDCCH monitoring.
- After SCell activation, the UE shall send CQI/PMI/RI reports of the SCell(s) if configured/triggered even though there is no yet a valid CQI value to report (due to measurement delay). CQI is not reported for deactivated SCell(s) and there is no ambiguity when the reporting is restarted upon correct SCell activation. However, this does not solve the problems related to false activation/deactivation as mentioned above.
- A SPS activation with blind double PDCCH transmission of the command may be used to reduce the false SPS activation probability. Based on this, also the MAC CE activation/deactivation command can be sent blindly multiple times as described in more detail with the proposed method.

After sending an SCell activation/deactivation MAC command, the eNB repeats the command at least once in a subframe(s) eligible for repetition. Subframes eligible for the MAC command repetition are defined so that it is ensured that they do not collide for instance with the time when the UE retunes its receiver due to SCell activation/deactivation.

The method uses not only blind repetition of a command to reduce the possibility of a false event but additionally it may intelligently select the time of the repetition so that unnecessary HARQ retransmissions of the commands by the eNB are avoided. In addition, the method might not restrict the repetition to a fixed time instance or a timer based period. A set of time instances eligible for repetition is provided so that the eNB has flexibility to transmit the repetition(s) in case of practical scheduler/resource restrictions. Further, the method might not require any special UE processing like a timer or identification that the command is being repeated.

The method can be implemented as follows. The glitch duration due to SCell activation/deactivation may be estimated as follows:

For SCell measurement cycles, Table 1 shows the total glitch/retuning duration in the respective time of the measurement cycle.

TABLE 1

Estimates of total glitches' duration in the measurement cycle

| measCycleSCell [ms] | Total glitches' duration [ms] |
|---|---|
| 160 | 0 |
| 256 | 0 |
| 320 | 0 |
| 512 | 0 |
| 640 | <=3.2 ms |
| 1024 | <=5.12 ms |
| 1280 | <=6.4 ms |

It may be assumed that for a given SCell measurement cycle, the duration of one glitch is the same for retuning due to measurement and for retuning due to SCell activation/deactivation. Due to PDCCH/PDSCH reception, it may be assumed that real UE implementation floors single glitch duration (shown in Table 1) so that it is an integer number of subframes. Furthermore, the worst case single glitch duration may occur when there is one wake-up and one sleep within the SCell measurement cycle as there will be only two glitches in this time. Based on the above assumptions and calculations, Table 2 shows estimates of single glitch duration due to SCell activation/deactivation.

TABLE 2

Estimates of single glitch duration in the measurement cycle

| measCycleSCell [ms] | Glitch duration [ms] |
|---|---|
| 160 | 0 |
| 256 | 0 |
| 320 | 0 |
| 512 | 0 |
| 640 | 1 ms |
| 1024 | 2 ms |
| 1280 | 3 ms |

Based on Table 2, the method implementation is designed to be able to avoid the worst case glitch duration of 3 ms.

Figure 3:
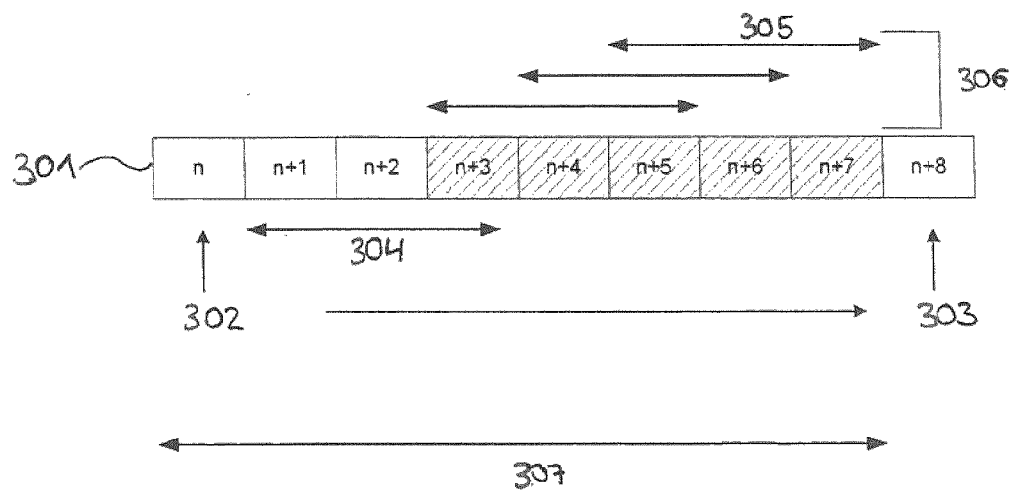
FIG. 3 shows a diagram illustrating an estimation of glitch location.

The glitch location due to SCell activation/deactivation may be estimated as follows and as shown in FIG. 3 showing a diagram illustrating an estimation of glitch location:

The downlink timing at the UE is shown by the subframes 301. The activation time 307 may be 8 ms (in subframe n+8 (303)) from the MAC CE command reception 302 at the UE (in subframe n). The UE processing time 304 may be 3 ms−TA. Therefore, if the command 302 is correctly received in subframe n, considering the processing time, the UE will be able to start retuning the receiver in subframe n+3 or n+4 or n+5 (most likely in subframe>n+3) and the UE will resume the PDCCH/PDSCH reception in subframe n+6 or n+7 or n+8 (n+8 is the required latest time). The worst glitch duration may thus be 3 ms (305). The arrows 306 represent possible glitch locations.

Finally, the implementation of the method may be specified based on the below considerations in Table 3, indicating which subframes are eligible for the SCell activation/deactivation command repetition:

The eNB may ensure that at least two SCell activation/deactivation commands are L1 ACKed by the UE. The eNB might assume that the SCell activation state is changed after receiving the L1 ACK for the repeated command or already after receiving the L1 ACK for the initial command (the latter preferred due to lower delay).

The eNode B might repeat the command after receiving the L1 ACK for the previous command or without waiting for the ACK/HARQ retransmissions of the previous command (the latter preferred due to lower delay).

The repeated command(s) should be sent on the cell that is not supposed to change its activation state for this addressed UE (e.g. PCell).

Two options are presented in Table 3: optimized and simplified. Considering that a single repetition of the Command may ensure low enough probability of false SCell activation/deactivation, the simplified option might be preferred due to implementation complexity.

TABLE 3

Subframes eligible for SCell activation/deactivation command repetition

| measCycleSCell [ms] | Subframes eligible for SCell activation/deactivation command repetition initially transmitted in subframe n | |
| --- | --- | --- |
| | Optimized option | Simplified option |
| 160 | any | n + 1, n + 2, >n + 7 |
| 256 | any | n + 1, n + 2, >n + 7 |
| 320 | any | n + 1, n + 2, >n + 7 |
| 512 | any | n + 1, n + 2, >n + 7 |
| 640 | n + 1, n + 2, (n + 3), >n + 7 | n + 1, n + 2, >n + 7 |
| 1024 | n + 1, n + 2, (n + 3), >n + 7 | n + 1, n + 2, >n + 7 |
| 1280 | n + 1, n + 2, (n + 3), >n + 7 | n + 1, n + 2, >n + 7 |

It should be noted that for shorter glitch duration one cannot safely extend the set of eligible subframes because it is up to the UE implementation (and can vary for different UEs) when the UE will start retuning within the estimated period from n+3 to n+7 in response to the command correctly received in subframe n.

According to the described method, the number of repetitions may be configurable, and the use of the command repetition may depend on the UE's radio conditions (estimated for instance by RRM measurements/CQI measurements/sounding).

The described method may provide the following advantages:
  Reduced probability of false SCell activation/deactivation and robust CA operation
  Avoidance of CSI/PDCCH/PDSCH interference in UL and DL
  Avoidance of unnecessary UE battery consumption
  The complexity of the proposed solution is manageable
  Low signalling overhead as the MAC CE can be sent together with UE data
  The delay incurred due to the described method may be none or minimal (depending on the implementation details).
  Scalable to more than two cells.

Alternatively, false SCell activation/deactivation can be detected by the eNB based on the CQI of the SCell. This may be based on the fact that CQI of a cell is not measured/reported in case it is deactivated. However, the disadvantages of the solution include: Increased complexity of blind detection on PUSCH/PUCCH, not well scalable to more than 2 cells (some SCell activation/deactivation events will not change the format of CQI reports), delay/robustness (in low SINR conditions, distinguish if the report was or was not transmitted might be unreliable and thus require multiple occasions), after detecting a false event, the eNB would have to anyway repeat the SCell activation/deactivation command.

Figure 4:
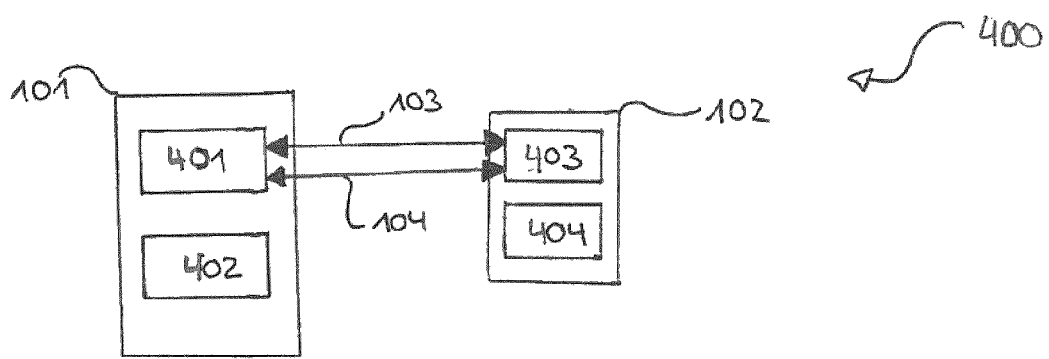
FIG. 4 shows a base station and a user equipment within a cellular network system according to an exemplary embodiment of the invention.

FIG. 4 shows a cellular network system 400 according to an exemplary embodiment of the invention. The cellular network system comprises a base station 101 and a user equipment 102 being served by the base station.

The base station and the user equipment may communicate via a first communication carrier 103 being assigned to the base station. Signals between the base station and the user equipment are transmittable using the first communication carrier and, if a second communication carrier 104 is activated, using in addition the second communication carrier. The first communication carrier is divided into subframes.

The base station 101 may inform the user equipment 102 of an activity status of the second communication carrier 104 within the cellular network system 400. The base station comprises a sending unit 401 being adapted to send an activity signal to the user equipment. The activity signal comprises information concerning the activity status of the second communication carrier. The sending unit is further adapted to re-send the activity signal to the user equipment during predefined subframes.

The base station may comprise a receiving unit, for example a receiver as known by a skilled person. The receiver and the transmitter or sending unit may be implemented as one single unit, for example as a transceiver. The transceiver or the receiving unit and the sending unit may be adapted to communicate with the user equipment via an antenna.

The base station may further comprise a control unit 402, for instance being adapted to define the predefined subframes. The control unit may be implemented as a single unit or may be implemented for example as part of a standard control unit, like a CPU or a micro-controller.

The base station 101 may be any type of access point or point of attachment, which is capable of providing a wireless access to a telecommunication network. Thereby, the wireless access may be provided for the user equipment 102 or for any other network element, which is capable of communicating in a wireless manner, for instance also a second base station.

The user equipment (UE) 102 may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a configuration unit 404 for configuring the transmission based on the information received from the base station. Such a configuration unit may be adapted to configure the user equipment to transmit via the first communication carrier and/or the second communication carrier. The configuration unit of the user equipment may be implemented for example as part of a control unit, like a CPU or a microcontroller.

The user equipment may 102 may comprise a transmitting unit for transmitting signals to the base station 101. The user equipment may further comprise a receiving unit being adapted to receive signals from the base station. The transmitting unit may be a transmitter as known by a skilled person, and the receiving unit may be a common known receiver. The transmitting unit and the receiving unit may be integrated in one single unit, for example a transceiver 403. The transceiver or the receiving and the transmitting unit may be adapted to communicate with the base station via an antenna. The configuration unit and the transceiver may be coupled or may be implemented as one single unit.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the determination unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Base station
102 User equipment
103 First communication carrier
104 Second communication carrier
301 DL timing at UE
302 Reception of secondary cell activation/deactivation command
303 Secondary cell activation/deactivation
304 UE processing time
305 Worst case glitch duration
306 Possible glitch locations
307 HARQ round trip time
400 Cellular network system
401 Sending unit of base station
402 Control unit of base station
403 Transceiver of user equipment
404 Configuration unit of user equipment

The invention claimed is:

1. A method for carrier aggregation, the method comprising:
sending an activity signal from a base station to a user equipment, wherein the user equipment is served by the base station and is adapted to communicate with the base station via a first communication carrier being assigned to the base station, wherein signals between the base station and the user equipment are transmittable using the first communication carrier and, if a second communication carrier is activated, using in addition the second communication carrier, wherein the first communication carrier is divided into subframes, wherein the activity signal comprises information concerning an activity status of the second communication carrier,
determining subframes, in which the user equipment is adapted to reconfigure a receiver,
defining predefined subframes which are different than the determined subframes, and
re-sending the activity signal from the base station to the user equipment during the predefined subframes.

2. The method as set forth in claim 1, wherein the re-sending the activity signal is carried out in addition to hybrid automatic repeat request transmissions.

3. The method as set forth in claim 1, wherein the information concerning the activity status comprises information about an activation or deactivation of the second communication carrier.

4. The method as set forth in claim 1, wherein sending the activity signal and re-sending the activity signal is based on sending a medium access control signal.

5. The method as set forth in claim 1, wherein the predefined subframes correspond to subframes, in which the user equipment is adapted to receive a signal from the base station.

6. The method as set forth in claim 1, wherein the predefined subframes correspond to subframes, which follow a subframe with an acknowledgement signal from the user equipment.

7. The method as set forth in claim 1, the method further comprising further re-sending the activity signal from the base station to the user equipment during predefined subframes.

8. The method as set forth in claim 1, the method further comprising sending, before sending the activity signal, a configuration signal for configuring the user equipment to transmit signals by using the first communication carrier and the second communication carrier, if the second communication carrier is activated.

9. The method as set forth in claim 8, wherein the configuration signal is based on radio resource control signaling.

10. The method as set forth in claim 1, the method further comprising
sending a further activity signal from the base station to the user equipment, wherein the further activity signal comprises information about an activity status of a third communication carrier, and
re-sending the further activity signal from the base station to the user equipment during predefined subframes,
wherein signals between the base station and the user equipment are transmittable using the first communication carrier and, if the second communication carrier and/or the third communication carrier is activated, using in addition the second communication carrier and/or the third communication carrier.

11. A base station for carrier aggregation, the base station comprising a processor and a non-transitory memory including computer program code; the memory and the computer program code configured to, with the processor, cause the base station at least to:

send an activity signal to a user equipment, wherein the user equipment is served by the base station and is adapted to communicate with the base station via a first communication carrier being assigned to the base station, wherein signals between the base station and the user equipment are transmittable using the first communication carrier and, if a second communication carrier is activated, using in addition the second communication carrier, wherein the first communication carrier is divided into subframes, wherein the activity signal comprises information concerning an activity status of the second communication carrier, determine subframes, in which the user equipment is adapted to reconfigure a receiver, define the predefined subframes such that they are different than the determined subframes, and re-send the activity signal to the user equipment during the predefined subframes.

12. The base station as set forth in claim 11, wherein re-sending the activity signal is carried out in addition to hybrid automatic repeat request transmissions.

13. The base station as set forth in claim 11, wherein the information concerning the activity status comprises information about an activation or deactivation of the second communication carrier.

14. The base station as set forth in claim 11, wherein sending the activity signal and re-sending the activity signal is based on sending a medium access control signal.

15. The base station as set forth in claim 11, wherein the predefined subframes correspond to subframes, in which the user equipment is adapted to receive a signal from the base station.

16. The base station as set forth in claim 11, wherein the predefined subframes correspond to subframes, which follow a subframe with an acknowledgement signal from the user equipment.

17. The base station as set forth in claim 11, wherein the memory and the computer program code are further configured to, with the processor, cause the base station at least to:

re-send the activity signal from the base station to the user equipment during predefined subframes.

18. The base station as set forth in claim 11, wherein the memory and the computer program code are further configured to, with the processor, cause the base station at least to:

send, before sending the activity signal, a configuration signal for configuring the user equipment to transmit signals by using the first communication carrier and the second communication carrier, if the second communication carrier is activated.

19. The base station as set forth in claim 11, wherein the memory and the computer program code are further configured to, with the processor, cause the base station at least to:

send a further activity signal from the base station to the user equipment, wherein the further activity signal comprises information about an activity status of a third communication carrier, and re-send the further activity signal from the base station to the user equipment during predefined subframes, wherein signals between the base station and the user equipment are transmittable using the first communication carrier and, if the second communication carrier and/or the third communication carrier is activated, using in addition the second communication carrier and/or the third communication carrier.

20. A cellular network system, the cellular network system comprising a base station as set forth in claim 11.

* * * * *